United States Patent
Zhang et al.

(10) Patent No.: US 11,770,741 B2
(45) Date of Patent: Sep. 26, 2023

(54) METHOD AND APPARATUS FOR CONTROLLING SIDELINK QOS (71) Applicant: Telefonaktiebolaget LM Ericsson (publ), Stockholm (SE)

(72) Inventors: Congchi Zhang, Shanghai (CN); Marco Belleschi, Solna (SE); Zhang Zhang, Beijing (CN); Yunxi Li, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 220 days.

(21) Appl. No.: 17/265,952

(22) PCT Filed: Aug. 9, 2019

(86) PCT No.: PCT/EP2019/071457
§ 371 (c)(1),
(2) Date: Feb. 4, 2021

(87) PCT Pub. No.: WO2020/030793
PCT Pub. Date: Feb. 13, 2020

(65) Prior Publication Data
US 2021/0297905 A1 Sep. 23, 2021

(30) Foreign Application Priority Data
Aug. 10, 2018 (WO) ............... PCT/CN2018/100024

(51) Int. Cl.
*H04W 28/24* (2009.01)
*H04W 76/27* (2018.01)
(Continued)

(52) U.S. Cl.
CPC ....... *H04W 28/24* (2013.01); *H04W 28/0263* (2013.01); *H04W 28/0268* (2013.01); *H04W 76/27* (2018.02); *H04W 92/18* (2013.01)

(58) Field of Classification Search
CPC ............. H04W 28/24; H04W 28/0263; H04W 28/0268; H04W 76/27; H04W 92/18
See application file for complete search history.

(56) References Cited

U.S. PATENT DOCUMENTS

2014/0204847 A1    7/2014   Belleschi et al.
2019/0124015 A1*   4/2019   Loehr .................... G06F 21/43
(Continued)

FOREIGN PATENT DOCUMENTS

EP    3125643 A1    2/2017
EP    3148285 A1    3/2017
(Continued)

OTHER PUBLICATIONS

International Search Report and Written Opinion of the International Searching Authority for PCT International Application No. PCT/EP2019/071457 dated Jan. 7, 2020.
(Continued)

*Primary Examiner* — Ajay Cattungal
(74) *Attorney, Agent, or Firm* — SAGE PATENT GROUP (57) ABSTRACT The present application generally relates to wireless communication technology. More particularly, it relates to a method and apparatus for controlling sidelink (SL) Quality of Service (QoS). According to one or more embodiments, a method for controlling sidelink (SL) Quality of Service (QoS) comprising the following steps carried out at a User Equipment (UE): a) generating QoS requirement from characteristics for one or more packets to be transmitted via a sidelink; b) determining bearer configuration corresponding to the QoS requirement; and c) performing SL transmission on the basis of the bearer configuration.

30 Claims, 6 Drawing Sheets (51) Int. Cl.
  *H04W 28/02* (2009.01)
  *H04W 92/18* (2009.01)

(56) References Cited

U.S. PATENT DOCUMENTS

| | | | |
|---|---|---|---|
| 2020/0084669 A1* | 3/2020 | Belleschi | H04W 72/1263 |
| 2020/0367093 A1* | 11/2020 | Belleschi | H04W 28/0263 |
| 2021/0297905 A1* | 9/2021 | Zhang | H04W 76/27 |

FOREIGN PATENT DOCUMENTS

| | | |
|---|---|---|
| EP | 3858052 A1 | 8/2021 |
| WO | 2015163639 A1 | 10/2015 |
| WO | 2017051494 A1 | 3/2017 |
| WO | 2017158515 A1 | 9/2017 |
| WO | 2018016157 A1 | 1/2018 |
| WO | 2019149182 A1 | 8/2019 |

OTHER PUBLICATIONS

International Preliminary Report on Patentability for PCT International Application No. PCT/EP2019/071457 dated Jan. 14, 2021.

3GPP TR 22.886 V16.0.0, "3rd Generation Partnership Project; Technical Specification Group Services and System Aspects; Study on enhancement of 3GPP support for 5G V2X services (Release 16)," Technical Report, Jun. 2018, 67 pages.

3GPP TS 23.501 V15.2.0, "3rd Generation Partnership Project; Technical Specification Group Services and System Aspects; System Architecture for the 5G System; Stage 2 (Release 15)," Technical Specification, Jun. 2018, 217 pages.

3GPP TS 23.303 V15.1.0 , "3rd Generation Partnership Project; Technical Specification Group Services and System Aspects; Proximity-based services (ProSe); Stage 2 (Release 15)," Technical Specification, Jun. 2018, 130 pages.

Office Action dated Dec. 12, 2022 for European Patent Application No. 19753321.9, 6 pages.

* cited by examiner

METHOD AND APPARATUS FOR CONTROLLING SIDELINK QOS

CROSS REFERENCE TO RELATED APPLICATIONS

This application is a 35 U.S.C. § 371 national stage application of PCT International Application No. PCT/EP2019/071457 filed on Aug. 9, 2019, which itself is a continuation of PCT International Application No. PCT/CN2018/100024, filed Aug. 10, 2018, the disclosures and contents of which are incorporated by reference herein in their entireties.

TECHNICAL FIELD

The present application generally relates to wireless communication technology. More particularly, the present application relates to a method and apparatus for controlling sidelink (SL) QoS. The present application also relates to apparatus and computer program product adapted for the same purpose.

BACKGROUND

Currently, there are many Use Cases (UCs) under discussion within Vehicle to Everything or V2X context, e.g. platooning, cooperative driving, car following and hazard zone warning etc. Many of them have stringent requirements on QoS, e.g. 99.9% reliability and 50 ms maximum latency.

In the Uu interface (radio interface between the mobile and the radio access network), QoS control is handled on bearer level in Long Term Evolution (LTE) and on QoS flow level in 5GS. Different from the QoS control mechanism used in cellular network, QoS control in Sidelink (SL) is based on the concept of ProSe Per-Packet Priority (PPPP) and ProSe Per-Packet Reliability (PPPR). When the ProSe upper layer (i.e. above PC5 access stratum) passes a protocol data unit for transmission to the PC5 access stratum, the ProSe upper layer provides a ProSe Per-Packet Priority from a range of 8 possible values. Each PPPP expresses a relative priority compared to other PPPPs, i.e. PPPP=1 has highest priority than PPPP=2, PPPP=3, etc. PPPPs also expresses the relative latency requirements, i.e. PPPP=1 has more stringent packet delay budget (PDB) requirements than PPPP=2, PPPP=3, etc. Additionally, along with the PPPP, upper layers may also indicate the PPPR value of a given packet. Priority queues (both intra-UE and inter-UE) are expected to be served in priority order i.e. UE (User Equipment) serves all packets associated with ProSe Per-Packet Priority N before serving packets associated with priority N+1 (lower number meaning higher priority). Similarly, the PPPR is used to determine whether SL packet duplication to enhance transmission reliability shall be used or not.

When a network (NW) scheduled operation mode (also known as mode-3) is used, NW configures a mapping between Logical Channel Groups (LCGs) and PPPPs for the sake of Sidelink Buffer Status Report (SL-BSR) reporting, and UE indicates in SL-BSR the LCGs for which there are packets to transmit over the PC5 interface (interface between 2 UEs, also referred as Sidelink interface). When eNB receives the SL-BSR, it can determine which are the PPPPs of the packets UE needs to transmit over PC5, thereby also inferring the priority info and the packet delay budget. eNB can use the priority information reflecting PPPP for priority handling and UE-PC5-Aggregate Maximum Bit Rate (AMBR) for capping the UE PC5 transmission in the resources management. For the case of PPPR, eNB/gNB may reserve one or more LCGs for PPPPR reporting. Upon receiving the SL-BSR, the eNB/gNB can, for example, decide whether to enable packet duplication or not.

In an autonomous resources selection mode (referring to as mode-4), PPPP is contained in SCI to avoid other UEs transmitting on the high priority resources. UE derives the packet delay budget of the V2X message from PPPP based on the provisioned mapping information described.

SUMMARY

One of the objects is to provide methods and apparatus for controlling sidelink (SL) QoS in a cellular network, which could provide more solid sidelink QoS.

According to one embodiment, a method for controlling sidelink (SL) Quality of Service (QoS) in a cellular network comprises the following steps carried out at a network node:
  a) in response to a SL bearer request indicating QoS requirement from a user equipment (UE), determining whether the bearer request is accepted on the basis of SL resources usage in a cellular network;
  b) if accepted, determining bearer configuration for SL transmission by the UE on the basis of the QoS requirement; and
  c) transmitting the bearer configuration to the UE.

According to another embodiment, an apparatus for controlling sidelink (SL) QoS in a cellular network comprises:
  a storage device configured to store a computer program comprising computer instructions; and
  a processor coupled to the storage device and configured to execute the computer instructions to:
  a) in response to a bearer request indicating Quality of Service (QoS) requirement from a User Equipment (UE), determining whether the bearer request is accepted on the basis of SL resources usage in a cellular network;
  b) if accepted, determining bearer configuration for SL transmission by the UE on the basis of the QoS requirement; and
  c) transmitting the bearer configuration to the UE.

According to another embodiment, a method for controlling sidelink (SL) Quality of Service (QoS) in a cellular network, comprises the following steps carried out at a network node:
  a) in response to attachment to the cellular network or location update of a User Equipment (UE), determining bearer configuration for SL transmission by the UE; and
  b) transmitting the bearer configuration to the UE.

According to another embodiment, an apparatus for controlling sidelink (SL) Quality of Service (QoS) in a cellular network comprises:
  a storage device configured to store a computer program comprising computer instructions; and
  a processor coupled to the storage device and configured to execute the computer instructions to:
  a) in response to attachment to the cellular network or location update for a User Equipment (UE), determining bearer configuration for SL transmission by the UE; and
  b) transmitting the bearer configuration to the UE.

According to another embodiment, a method for controlling sidelink (SL) Quality of Service (QoS) in a cellular network comprises the following steps carried out at a network node:

a) determining bearer configuration for SL transmission by a User Equipment (UE) in an Radio Resource Control (RRC) idle mode in the cellular network; and
b) broadcasting the bearer configuration in one or more cells of the cellular network.

According to another embodiment, an apparatus for controlling sidelink (SL) Quality of Service (QoS) in a cellular network comprises:

a storage device configured to store a computer program comprising computer instructions; and a processor coupled to the storage device and configured to execute the computer instructions to:
a) determining bearer configuration for SL transmission by a User Equipment (UE) in an Radio Resource Control (RRC) idle mode in the cellular network; and
b) broadcasting the bearer configuration in one or more cells of the cellular network.

According to another embodiment, a method for controlling sidelink (SL) Quality of Service (QoS) in a cellular network comprises the following steps carried out at a User Equipment (UE):
a) generating QoS requirement from characteristics for one or more packets to be transmitted via a sidelink;
b) transmitting a bearer request comprising the QoS requirement to a network node; and
c) performing SL transmission on the basis of bearer configuration received from the network node, wherein the bearer configuration is determined on the basis of the QoS requirement.

According to another embodiment, a User Equipment (UE) operating in a cellular network with sidelink (SL) Quality of Service (QoS) controlling function comprises:

a storage device configured to store a computer program comprising computer instructions; and a processor coupled to the storage device and configured to execute the computer instructions to:
a) generating QoS requirement from characteristics for one or more packets to be transmitted via a sidelink;
b) transmitting a bearer request comprising the QoS requirement to a network node; and
c) performing SL transmission on the basis of bearer configuration received from the network node, wherein the bearer configuration is determined on the basis of the QoS requirement.

According to another embodiment, a method for controlling sidelink (SL) Quality of Service (QoS) comprises the following steps carried out at a User Equipment (UE):
a) generating QoS requirement from characteristics for one or more packets to be transmitted via a sidelink;
b) determining bearer configuration corresponding to the QoS requirement; and
c) performing SL transmission on the basis of the bearer configuration.

According to another embodiment, a User Equipment (UE) with sidelink (SL) Quality of Service (QoS) controlling function comprises:
a storage device configured to store a computer program comprising computer instructions; and
a processor coupled to the storage device and configured to execute the computer instructions to:
a) generating QoS requirement from characteristics for one or more packets to be transmitted via a sidelink;
b) determining bearer configuration corresponding to the QoS requirement; and
c) performing SL transmission on the basis of the bearer configuration.

Current SL QoS control is based on basic relative priorities/reliabilities requirements differences, which can only secure the QoS of some particular UEs is better than that of other UEs but cannot secure an explicitly required QoS level, e.g. 20 ms latency, of a particular V2X service of a UE. Moreover, for the UE using mode4 (UE autonomous resource selection), it is even worse, when all transmitting UEs are sharing resources. The QoS is mainly depending on the size of resource pool, and the number of UEs being using the pool. According to one or more embodiments, it provides mechanisms to improve SL QoS control enforcement. In particular, QoS requirement may be determined at UE and then mapped into the corresponding data radio bearer for transmission according to the bearer configuration determined at network node. Furthermore, admission control could also be applied to help NW reject SL bearer requests when the channel is full or preempt low priority bearers for high priority ones.

BRIEF DESCRIPTION OF THE DRAWINGS

The foregoing and other objects, features, and advantages would be apparent from the following more particular description of preferred embodiments as illustrated in the accompanying drawings in which.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "User Equipment (UE)" refers to a device used directly by an end-user to communicate. The non-exclusive examples of the UE include a hand-held telephone, a laptop computer equipped with a mobile broadband adapter, or any other device.

Figure 1:
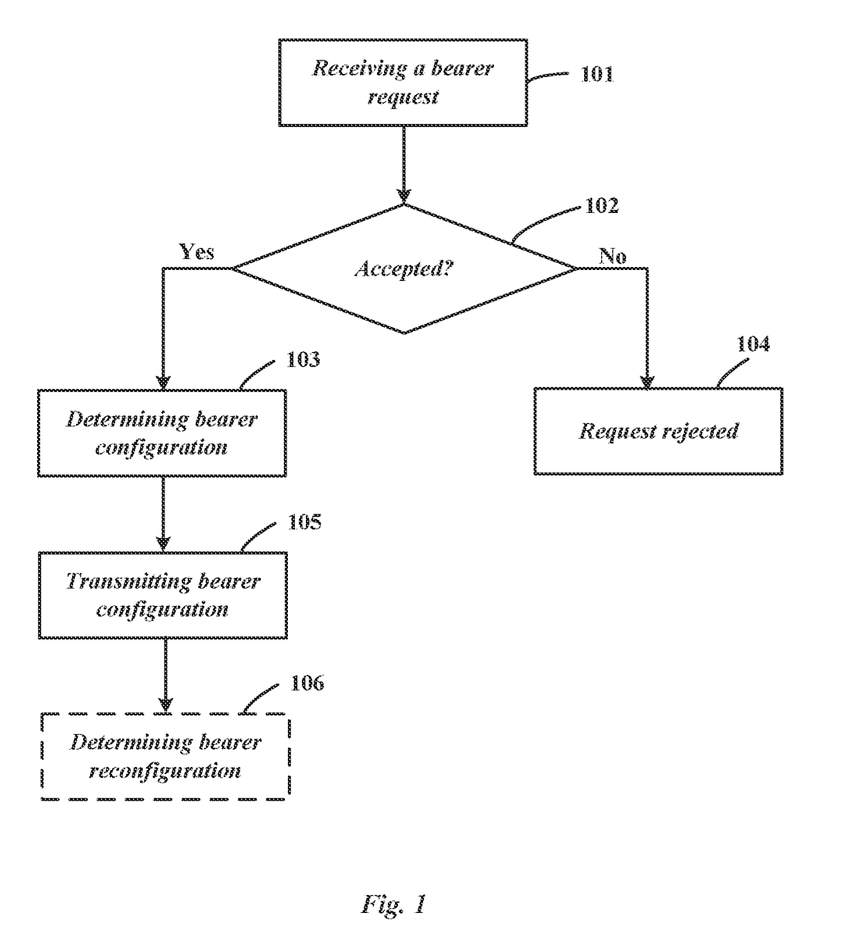
FIG. 1 is a flow diagram illustrating a process for controlling sidelink (SL) Quality of Service (QoS) in a cellular network according to one or more exemplary embodiment.

FIG. 1 is a flow diagram illustrating a process for controlling sidelink (SL) Quality of Service (QoS) in a cellular network according to one or more exemplary embodiment.

With reference to FIG. 1, at step 101, a network node, such as eNB/gNB, V2X control function or V2X server Node receives a SL bearer request from a user equipment (UE). The SL bearer request indicates QoS requirement, which, e.g., reflects QoS demand for SL transmission by the UE. In one embodiment, the QoS requirement is represented as one of 5G QoS Indicator (5QI), QoS Class Identifier (QCI), ProSe Per-Packet Priority (PPPP) or ProSe Per-Packet Reliability (PPPR).

At step 102, the network node determines whether the bearer request is accepted on the basis of SL resources usage in the cellular network. If accepted, the process proceeds to step 103, which will be described in detail; otherwise, it proceeds to step 104 where the network node transmits to the UE a notification that the SL bearer request is rejected.

Due to limited resources, it is necessary for the network node to control the number of UEs which are transmitting via sidelink at the same time. Preferably, at step 102, the determining is performed as follows:

if there are SL resources sufficient to fulfill the QoS requirement, the bearer request will be accepted;

if after dropping other bearer(s) with lower priority, there are SL resources sufficient to fulfill the QoS requirement, the bearer request will be accepted; and if after dropping other bearer(s) with lower priority, there are still no SL resources to fulfill the QoS requirement, the bearer request will be rejected.

In one embodiment, the SL resources are in form of one or more resource pools, each of which corresponds to a respective QoS requirement. Moreover, the network node can configure the resource pools individually. In some cases, the configuration for the resource pools can be adjusted at the network node by, e.g., adding new resource pool(s) or increasing the size of at least one of the resource pools.

In one embodiment, the network node may configure a plurality of resource pools corresponding to different QoS requirements. Several pools may be designated to one QoS requirement. For each pool, the network node evaluates whether the SL transmission by a new UE will degrade the QoS performance for the existing users in the pool. For example, the network node may specify some pools as ones where their QoS performance is not allowed to degrade. To this end, the network node may grant the pool with the least load to the new UE. If no pool satisfying the above criteria is available, the network node may carry out at least one of the following operations:

adjusting resource pool configuration and searching the pool satisfying the above criteria again;

revoking existing bearers from other UEs and accepting the bearer request;

rejecting the SL bearer request from the new UE.

Preferably, a QoS threshold and a congestion level threshold can be assigned to one or more resource pools. With such configuration, the UE is allowed to use the resource pools for the SL transmission (only) if a congestion level of the resource pools is lower than the congestion level threshold for the QoS threshold. For example, the network node may assign different QoS threshold and different associated congestion level to the same pool. The UE is allowed to start transmitting packets having a certain QoS on a given pool (only) if the congestion level (such as CBR) of such pool is lower than a certain congestion level threshold for the concerned QoS level. The UE shall stop using such pool if the congestion degrades above another congestion level for the concerned QoS level.

Turning to step 103, where the network node determines bearer configuration for SL transmission by the UE on the basis of the QoS requirement. Preferably, the determining may be performed as follows:

retrieving an index corresponding to the QoS requirement;

if succeeding, generating or obtaining the bearer configuration associated with the index; and if failed, transmitting a notification that the QoS requirement is not supported by the cellular network.

In one embodiment, in the case where the QoS requirement is not supported by the cellular network, the UE may either drop the corresponding QoS session/QoS flow/packet transmission or perform SL transmissions in best effort strategy. For example, the UE may use the resources provided by the network for low priority transmissions where, for example, no latency requirements, bit rate, can be guaranteed. In another embodiment, the network node may transmit to the UE information specifying which QoS requirement(s) can be supported in order to avoid non-supportable QoS demand from the UE. Preferably, the information is transmitted during an attachment procedure or via a System Information Block (SIB).

In one embodiment, preferably, the bearer configuration comprises a mapping relationship between the QoS requirement and a SL Data Radio Bearer (DRB). Optionally, the bearer configuration may further comprise one or more transmitting parameters. More preferably, the transmitting parameters comprises at least one of transmitting power for SL transmission, Modulation Coding Scheme (MCS), carrier aggregation, packet duplication configuration, and SL resources being used.

Then, the process proceeds to step 105 where the network node transmits the bearer configuration as determined at step 104 to the UE. Upon reception of the bearer configuration, at the UE, a SDAP layer maps the QoS flows, e.g., the QCI/5QI of the incoming packets/QoS flows into PC5 data radio bearer associated with the corresponding LCID as indicated in the bearer configuration.

Optionally, the process proceeds to step 106 where the network node determines bearer reconfiguration for SL transmission on the basis of QoS performance. For example, in one embodiment, the network node may keep monitoring the QoS performance during the time based on feedbacks and reports sent from SL UEs. Link adaptation can be applied to achieve the required QoS. If the required QoS cannot be fulfilled during a certain amount of time, the current bearer will be modified or revoked.

Figure 2:
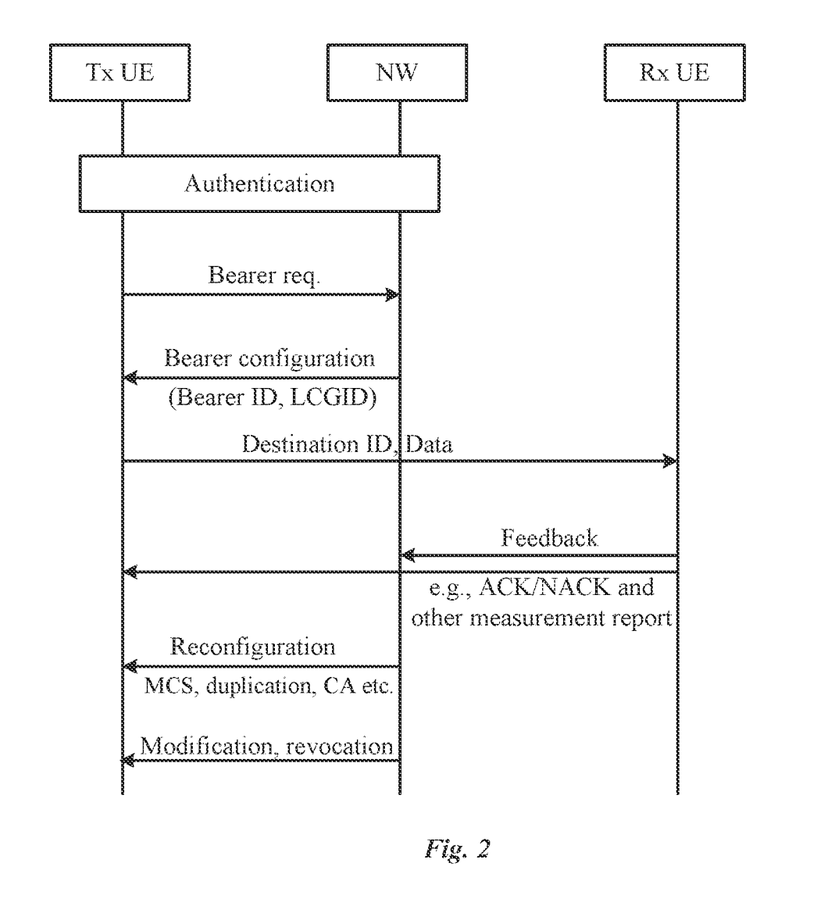
FIG. 2 shows an example of NW SL QoS enforcement for In-Coverage connected mode according to one or more exemplary embodiment.

FIG. 2 shows an example of NW SL QoS enforcement for In-Coverage connected mode according to one or more exemplary embodiment.

In the scenario as shown in FIG. 2, TxUE and RxUE are in coverage and operate in RRC connected mode, an explicit permission from the NW is needed to establish and configure a SL bearer. Referring to FIG. 2, after an authentication procedure succeeds, TxUE sends a SL bearer request to NW for activating SL service. The information related to the SL bearer request can be sent via RRC, e.g. as part of SLUeInformation signal, including 5QI/QCI packets currently in an SL buffer, or related to SL QoS flows. For example, the SL bearer request can be sent upon indication from upper layers that a certain V2X QoS session shall be initiated over a PC5 interface.

In one implementation, the 5QI/QCI reported to NW in the SL bearer request are addressed by an index which is given to the UE via dedicated or SIB signaling by NW for each possible 5QI/QCI. In case a given 5QI/QCI is not associated with any index, it indicates that NW does not support NW controlled QoS for that specific 5QI/QCI in a concerned cell. In this case, TxUE shall either drop the corresponding QoS session/QoS flow/packet transmission, in which case AS layers at TxUE may indicate upper layers that such packet/QoS sessions/QoS flow shall be dropped, or perform transmissions of such QoS flow in best effort fashion, e.g. UE may use a pool of resources provided by NW for low priority transmissions where, for example, no latency requirements, bit rate, can be guaranteed. To this end, NW may indicate unallowable QCI/5QI in the concerned cell or indicate allowable QCI/5QI instead.

Referring to FIG. 2, upon reception of the SL bearer request, based on the current load in sidelink channel, NW determines whether the demanded QoS can be supported and returns acceptation or rejection accordingly. It shall be noted that if channel is unavailable, NW shall drop some low priority bearers in order to support the requested bearer with higher priority.

If the SL bearer request is accepted, NW will also configure, e.g. via RRC reconfiguration signaling, QoS to data radio bearer mapping in SL UE, e.g. SDAP layer. Such signal may indicate the mapping between the 5QI/QCI previously signaled in the SL bearer request and a PC5 DRB identity such as LCID, LCG, and a set of transmitting parameter configuration such as transmitting power, Modulation Coding Scheme (MCS), carrier aggregation, packet duplication configuration, and SL resources being used.

Upon reception of the bearer configuration from NW, at TxUE, the SDAP layer maps QoS flows, i.e. the QCI/5QI of the incoming packets/QoS flows into PC5 data radio bearer associated with the corresponding LCID as indicated in the bearer configuration by NW.

As shown in FIG. 2, NW keeps monitoring the QoS performance during the time based on feedbacks and reports sent from SL UEs, e.g., RxUE. Link adaptation can be applied to achieve the required QoS. If the required QoS cannot be fulfilled during a certain amount of time, the current bearer will be modified or revoked.

Figure 3:
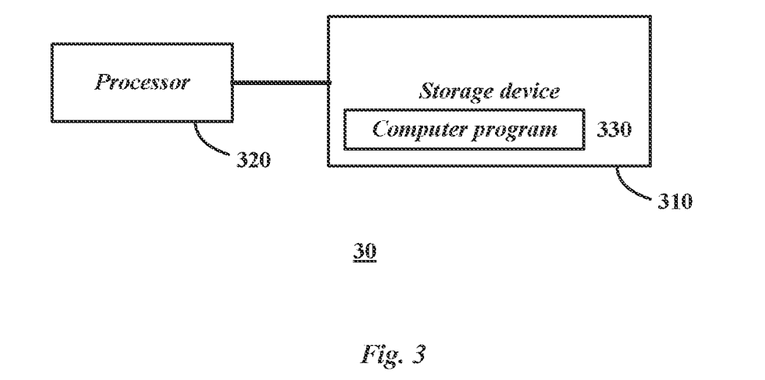
FIG. 3 is a block diagram illustrating an apparatus for controlling sidelink (SL) Quality of Service (QoS) in a cellular network according to one or more exemplary embodiment.

FIG. 3 is a block diagram illustrating an apparatus for controlling sidelink (SL) Quality of Service (QoS) in a cellular network according to one or more exemplary embodiment.

With reference to FIG. 3, the apparatus 30 comprises a storage device 310 and a processor 320 coupled to the storage device 310. The storage device 310 is configured to store a computer program 330 comprising computer instructions. The processor 320 is configured to execute the computer instructions to perform some or all of the method steps as shown in FIGS. 1 and 2.

Figure 4:
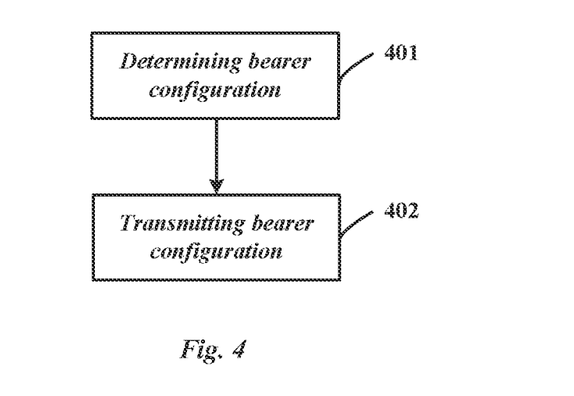
FIG. 4 is another flow diagram illustrating a process for controlling sidelink (SL) Quality of Service (QoS) in a cellular network according to one or more exemplary embodiment.

FIG. 4 is another flow diagram illustrating a process for controlling sidelink (SL) Quality of Service (QoS) in a cellular network according to one or more exemplary embodiment.

With reference to FIG. 4, at step 401, a network node, such as eNB/gNB, V2X control function or V2X server Node determines bearer configuration for SL transmission by the UE in response to attachment to the cellular network or location update of a User Equipment (UE).

In one embodiment, preferably, the bearer configuration is determined based on an operational mode in which the UE operates, and the operational mode comprise a Radio Resource Control (RRC) connected mode and a RRC idle mode. That is, depending on the operational mode in which the UE operates, the network node may determine different bearer configurations for the UE. Moreover, when mode 3 UEs and mode 4 UEs are using the same resource pool, the same bearer configuration can be applied, and vice versa.

In one embodiment, the bearer configuration provides QoS to data radio bearer mapping, which specifies, e.g. the usage of resource pools, LCID and LCG for each possible QoS flow. The network node may update the QoS to data radio bearer mapping.

In the process as shown in FIG. 4, SL UEs do not need explicit permission from NW before SL transmitting via a bearer. Instead these SL UEs will perform SL transmission on the basis of the bearer configuration from the network node during attachment procedure.

In one embodiment, preferably, the bearer configuration comprises a mapping relationship between the QoS requirement and a SL Data Radio Bearer (DRB). Optionally, the bearer configuration may further comprise one or more transmitting parameters. More preferably, the transmitting parameters comprises at least one of transmitting power for SL transmission, Modulation Coding Scheme (MCS), carrier aggregation, packet duplication configuration, and SL resources being used.

In another embodiment, the network node may transmit to the UE information specifying which QoS requirement(s) can be supported in order to avoid non-supportable QoS demand from the UE. Preferably, the information is transmitted during an attachment procedure or via a System Information Block (SIB).

Then, the process proceeds to step 402 where the network node transmits the bearer configuration as determined at step 401 to the UE.

Figure 5:
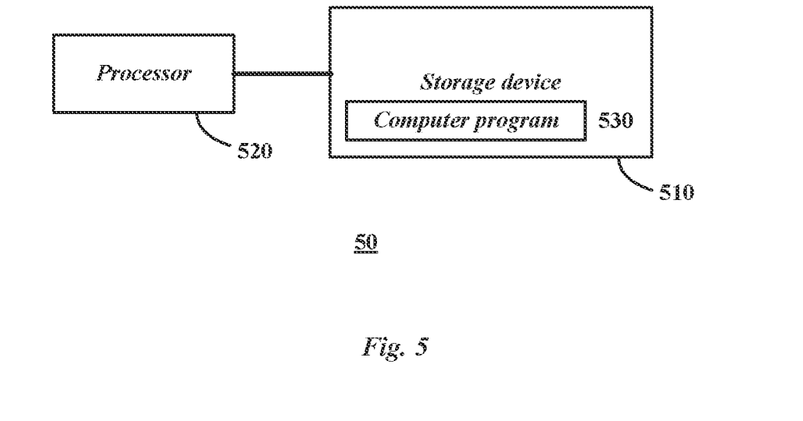
FIG. 5 is another block diagram illustrating an apparatus for controlling sidelink (SL) Quality of Service (QoS) in a cellular network according to one or more exemplary embodiment.

FIG. 5 is another block diagram illustrating an apparatus for controlling sidelink (SL) Quality of Service (QoS) in a cellular network according to one or more exemplary embodiment.

With reference to FIG. 5, the apparatus 50 comprises a storage device 510 and a processor 520 coupled to the storage device 510. The storage device 510 is configured to store a computer program 530 comprising computer instructions. The processor 520 is configured to execute the computer instructions to perform some or all of the method steps as shown in FIG. 4.

Figure 6:
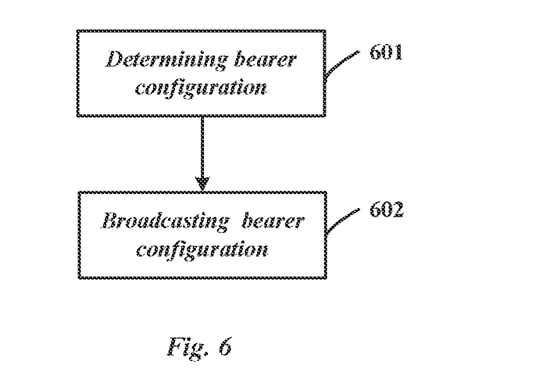
FIG. 6 is another flow diagram illustrating a process for controlling sidelink (SL) Quality of Service (QoS) in a cellular network according to one or more exemplary embodiment.

FIG. 6 is another flow diagram illustrating a process for controlling sidelink (SL) Quality of Service (QoS) in a cellular network according to one or more exemplary embodiment.

With reference to FIG. 6, at step 601, a network node, such as eNB/gNB, V2X control function or V2X server Node determines bearer configuration for SL transmission by the UE, which operates in a Radio Resource Control (RRC) idle mode.

In one embodiment, preferably, the bearer configuration comprises a mapping relationship between the QoS requirement and a SL Data Radio Bearer (DRB) Optionally, the bearer configuration may further comprise one or more transmitting parameters. More preferably, the transmitting parameters comprises at least one of transmitting power for SL transmission, Modulation Coding Scheme (MCS), carrier aggregation, packet duplication configuration, and SL resources being used.

Then, the process proceeds to step 602 where the network node broadcasts the bearer configuration as determined at step 601 in one or more cells of the cellular network where the UE resides. Preferably, the bearer configuration is broadcasted via a System Information Block (SIB). More preferably, the network node may transmit to the UE information specifying which QoS requirement(s) can be supported via a System Information Block (SIB).

Likewise, in the process as shown in FIG. 6, SL UEs do not need explicit permission from NW before SL transmitting via a bearer. Instead these SL UEs will perform SL transmission on the basis of the bearer configuration receiving from the network node while in the RRC idle mode.

Figure 7:
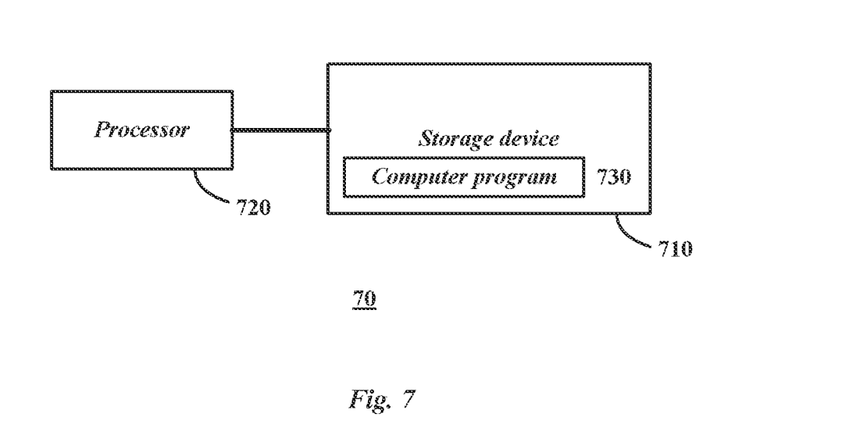
FIG. 7 is another block diagram illustrating an apparatus for controlling sidelink (SL) Quality of Service (QoS) in a cellular network according to one or more exemplary embodiment.

FIG. 7 is another block diagram illustrating an apparatus for controlling sidelink (SL) Quality of Service (QoS) in a cellular network according to one or more exemplary embodiment.

With reference to FIG. 7, the apparatus 70 comprises a storage device 710 and a processor 720 coupled to the storage device 710. The storage device 710 is configured to store a computer program 730 comprising computer instructions. The processor 720 is configured to execute the computer instructions to perform some or all of the method steps as shown in FIG. 6.

Figure 8:
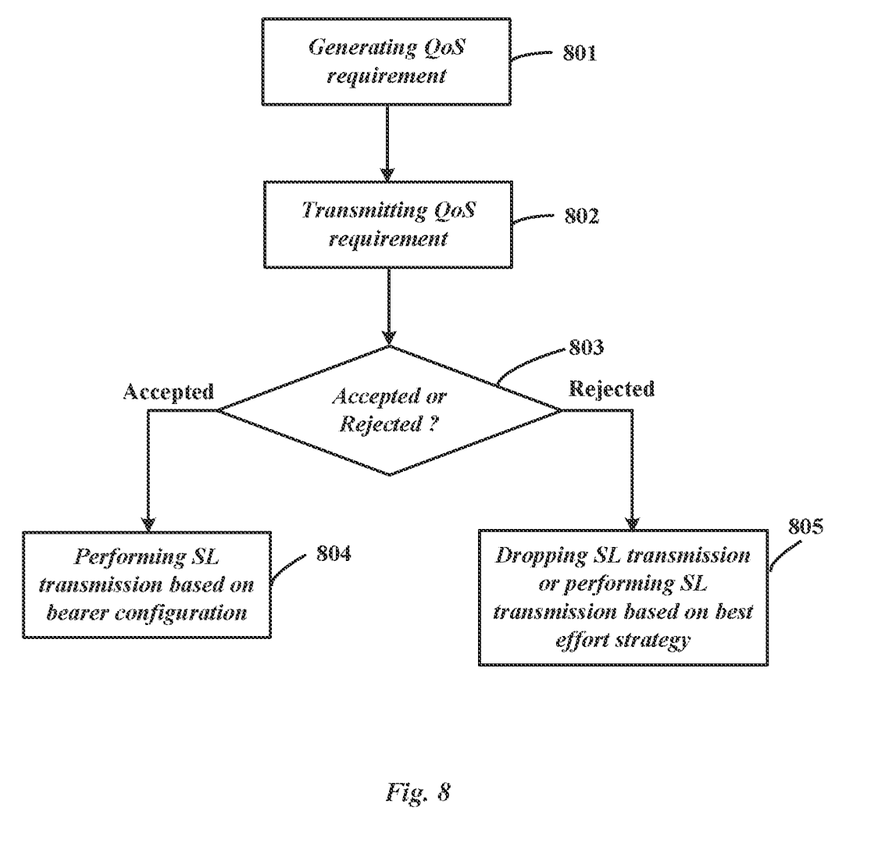
FIG. 8 is another flow diagram illustrating a process for controlling sidelink (SL) Quality of Service (QoS) in a cellular network according to one or more exemplary embodiment.

FIG. 8 is another flow diagram illustrating a process for controlling sidelink (SL) Quality of Service (QoS) in a cellular network according to one or more exemplary embodiment.

With reference to FIG. 8, at step 801, a UE generates QoS requirement from characteristics for one or more packets to be transmitted via a sidelink.

In one embodiment, preferably, the characteristics are defined in a packet header complying with a protocol layer above Access Stratum (AS). For example, the protocol layer above AS may be transport layer or network layer where IP is used for transmission over PC5 or ITS facility layer where geo-networking is used for transmission over PC5. As an example, the characteristics may be represented as classical 5-tuple IP characteristics, e.g., source IP address, destination IP address, source port number, destination port number, protocol in use. Alternatively, the characteristic may be represented as geo-networking packet properties, e.g. Source port, Destination port, Geo-Networking (GN) Destination address, GN Repetition interval indicating the periodicity of a given packet transmission, GN Maximum repetition time indicating the latency budget of a packet transmission, GN Traffic class, etc. Also, the specific V2X service in the form of PSID or ITS-AIDs can be indicated.

In one embodiment, preferably, the generating is performed by converting the characteristics into corresponding QoS requirement on the basis of a mapping relationship between the characteristics and the QoS requirement. For example, the mapping relationship may be represented with a table including one or more entries, each defining a combination of the characteristic and the QoS requirement. Preferably, each entry may be assigned an index, e.g., one as described with reference to FIG. 1.

The mapping relationship may be provided by the network node and can be updated by the network node. For example, the mapping relationship may be provided with NAS/AS signaling (e.g. RRC/SIB) and/or represented as part of RRC preconfiguration.

In one embodiment, the mapping relationship can be provided while the UE entering radio NW coverage, and this can be performed by a network node such as the eNB/gNB, V2X control function or by a policy control function (PCF), or by a unified data repository (UDR), or by V2X server, or preconfigured in Universal Integrated Card (UICC) and/or Mobile Equipment (ME). Alternatively, the mapping relationship can be provided via dedicated NAS or AS signaling in case the UE is in connected mode or via broadcast signaling (e.g., SIB) in case the UE is in idle mode.

In another embodiment, the mapping relationship depends on an operational mode, e.g., RRC connected mode, RRC idle mode or Out of Coverage (OoC) mode, in which the UE operates. Preferably, one or more candidate mapping relationships between the characteristics and the QoS requirement can be received from the network node and stored at the UE, each of which corresponds to one or more operational modes, and the operational mode comprises a Radio Resource Control (RRC) connected mode, a RRC idle mode and an Out of Coverage (OoC) mode. More preferably, the mapping relationship between the characteristics and the QoS requirement is selected from the one or more candidate mapping relationships depending on which operational mode the UE operates in.

At step 802, the UE transmits a bearer request comprising the QoS requirement as generated at step 801 to a network node. As described above, the network node may determine whether the bearer request is accepted on the basis of SL resources usage in the cellular network, and if accepted, it will transmit bearer configuration to the UE; otherwise, it will transmit to the UE a notification that the SL bearer request is rejected.

Then, the process proceeds to step 803 where the UE determines whether the SL bearer request is accepted or rejected. If accepted, it proceeds to step 804, and if rejected, it proceeds to step 805.

At step 804, the UE performs SL transmission on the basis of the bearer configuration received from the network node. For example, upon reception of the bearer configuration, at the UE, a Service Data Adaption Protocol (SDAP) layer maps the QoS flows, e.g., the QCI/5QI of the incoming packets/QoS flows into PC5 data radio bearer associated with the corresponding LCID as indicated in the bearer configuration.

On the other hand, at step 805, the UE may either drop the corresponding QoS session/QoS flow/packet transmission or perform SL transmissions in best effort strategy. For example, the UE may use the resources provided by the network for low priority transmissions where, for example, no latency requirements, bit rate, can be guaranteed.

In one embodiment, preferably, the bearer configuration comprises a mapping relationship between the QoS requirement and a SL Data Radio Bearer (DRB). Optionally, the bearer configuration may further comprise one or more transmitting parameters. More preferably, the transmitting parameters comprises at least one of transmitting power for SL transmission, Modulation Coding Scheme (MCS), carrier aggregation, packet duplication configuration, and SL resources being used.

Figure 9:
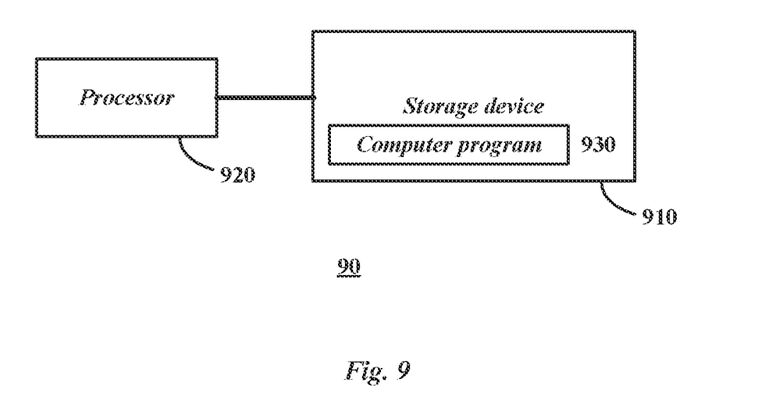
FIG. 9 is another block diagram illustrating a User Equipment (UE) operating in a cellular network with sidelink (SL) Quality of Service (QoS) controlling function according to one or more exemplary embodiment.

FIG. 9 is another block diagram illustrating a User Equipment (UE) operating in a cellular network with sidelink (SL) Quality of Service (QoS) controlling function according to one or more exemplary embodiment.

With reference to FIG. 9, UE 90 comprises a storage device 910 and a processor 920 coupled to the storage device 910. The storage device 910 is configured to store a computer program 930 comprising computer instructions. The processor 920 is configured to execute the computer instructions to perform some or all of the method steps as shown in FIG. 8.

Figure 10:
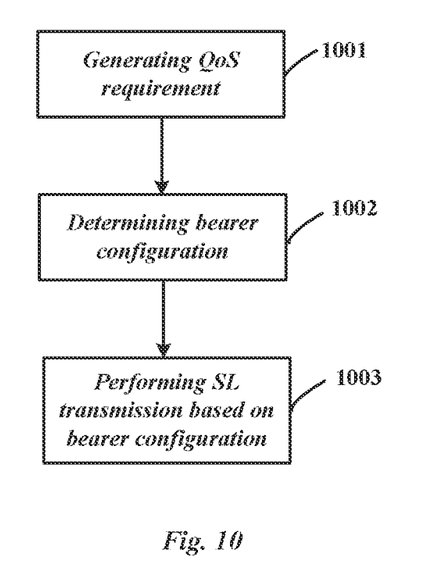
FIG. 10 is another flow diagram illustrating a process for controlling sidelink (SL) Quality of Service (QoS) in a cellular network according to one or more exemplary embodiment.

FIG. 10 is another flow diagram illustrating a process for controlling sidelink (SL) Quality of Service (QoS) in a cellular network according to one or more exemplary embodiment.

With reference to FIG. 10, at step 1001, a UE generates QoS requirement from characteristics for one or more packets to be transmitted via a sidelink.

In one embodiment, preferably, the characteristics are defined in a packet header complying with a protocol layer above Access Stratum (AS). For example, the protocol layer above AS may be transport layer or network layer where IP is used for transmission over PC5 or ITS facility layer where geo-networking is used for transmission over PC5. As an example, the characteristics may be represented as classical 5-tuple IP characteristics, e.g., source IP address, destination IP address, source port number, destination port number, protocol in use. Alternatively, the characteristic may be represented as geo-networking packet properties, e.g. Source port, Destination port, GN Destination address, GN Repetition interval indicating the periodicity of a given packet transmission, GN Maximum repetition time indicating the latency budget of a packet transmission, GN Traffic class, etc. Also, the specific V2X service in the form of PSID or ITS-AIDs can be indicated.

In one embodiment, preferably, the generating is performed by converting the characteristics into corresponding QoS requirement on the basis of a mapping relationship between the characteristics and the QoS requirement. For example, the mapping relationship may be represented with a table including one or more entries, each defining a combination of the characteristic and the QoS requirement. Preferably, each entry may be assigned an index, e.g., one as described with reference to FIG. 1.

The mapping relationship may be provided by the network node and can be updated by the network node. For example, the mapping relationship may be provided with Non-Access-Stratum/Access-Stratum (NAS/AS) signaling (e.g. RRC/SIB) and/or represented as part of RRC preconfiguration.

In one embodiment, the mapping relationship can be provided while the UE entering radio NW coverage, and this can be performed by a network node such as the eNB/gNB, V2X control function or by a policy control function (PCF), or by a unified data repository (UDR), or by V2X server, or preconfigured in UICC and/or ME. Alternatively, the mapping relationship can be provided via dedicated NAS or AS signaling in case the UE is in connected mode or via broadcast signaling (e.g., SIB) in case the UE is in idle mode.

In another embodiment, the mapping relationship depends on an operational mode, e.g., RRC connected mode, RRC idle mode or Out of Coverage (OoC) mode, in which the UE operates. Preferably, one or more candidate mapping relationships between the characteristics and the QoS requirement can be received from the network node and stored at the UE, each of which corresponds to one or more operational modes, and the operational mode comprises a Radio Resource Control (RRC) connected mode, an RRC idle mode and Out of Coverage (OoC) mode. More preferably, the mapping relationship between the characteristics and the QoS requirement is selected from the one or more candidate mapping relationships depending on which operational mode the UE operates in.

Alternatively, the candidate mapping relationships between the characteristics and the QoS requirement can be received via broadcast from the network node while the UE is in-coverage of the cellular network.

At step 1002, the UE determines bearer configuration corresponding to the QoS requirement as generated at step 1001. In one embodiment, the determining is on the basis of a mapping relationship between the QoS requirement and the bearer configuration. The mapping relationship can be received from the network node and stored at the UE. Alternatively, the mapping relationship can be preconfigured at the UE.

Alternatively, the mapping relationship between the QoS requirement and the bearer configuration can be received via broadcast from the network node while the UE is in-coverage of the cellular network.

Then, the process proceeds to step 1003 where the UE performs SL transmission on the basis of the bearer configuration as determined at step 1002. For example, a SDAP layer can map the QoS flows, e.g., the QCI/5QI of the incoming packets/QoS flows into PC5 data radio bearer associated with the corresponding Logical Channel Identification (LCID) as indicated in the bearer configuration.

In one embodiment, preferably, the bearer configuration comprises a mapping relationship between the QoS requirement and a SL Data Radio Bearer (DRB). Optionally, the bearer configuration may further comprise one or more transmitting parameters. More preferably, the transmitting parameters comprises at least one of transmitting power for SL transmission, Modulation Coding Scheme (MCS), carrier aggregation, packet duplication configuration, and SL resources being used.

Figure 11:
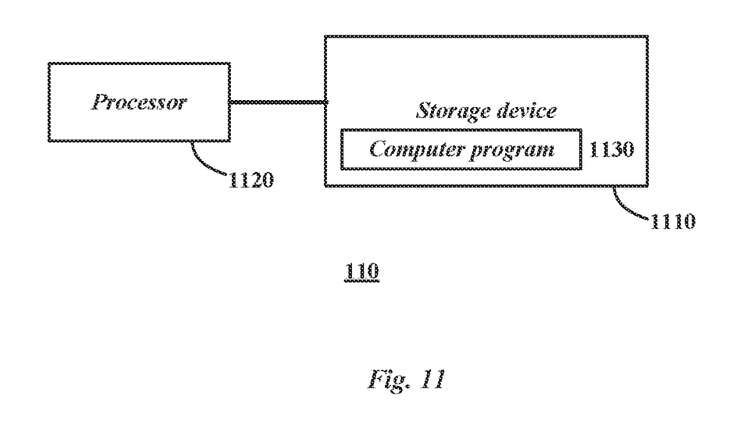
FIG. 11 is another block diagram illustrating A User Equipment (UE) operating in a cellular network with sidelink (SL) Quality of Service (QoS) controlling function according to one or more exemplary embodiment.

FIG. 11 is another block diagram illustrating a User Equipment (UE) operating in a cellular network with sidelink (SL) Quality of Service (QoS) controlling function according to one or more exemplary embodiment.

With reference to FIG. 11, UE 110 comprises a storage device 1110 and a processor 1120 coupled to the storage device 1110. The storage device 1110 is configured to store a computer program 1130 comprising computer instructions. The processor 1120 is configured to execute the computer instructions to perform some or all of the method steps as shown in FIG. 10.

According to one or more embodiments of the present invention, a method for controlling sidelink (SL) Quality of Service (QoS) in a cellular network, comprises the following steps carried out at a network node:
a) in response to a SL bearer request indicating QoS requirement from a user equipment (UE), determining (102) whether the bearer request is accepted on the basis of SL resources usage in a cellular network;
b) if accepted, determining (103) bearer configuration for SL transmission by the UE on the basis of the QoS requirement; and
c) transmitting (105) the bearer configuration to the UE.

Alternatively, the step a) comprises:
a1) if there are SL resources sufficient to fulfill the QoS requirement, the network node will accept the bearer request;
a2) if after dropping other bearer(s) with lower priority, there are SL resources sufficient to fulfill the QoS requirement, the network node will accept the bearer request; and
a3) if after dropping other bearer(s) with lower priority, there are still no SL resources to fulfill the QoS requirement, the network node will reject the bearer request.

Alternatively, the SL resources are in form of one or more resource pools, each of which corresponds to a respective QoS requirement.

Alternatively, configuration for the resource pools can be adjusted by adding new resource pool(s) or increasing the size of at least one of the resource pools.

Alternatively, a QoS threshold and a congestion level threshold are assigned to at least one of the resource pools and the UE is allowed to use the at least one of the resource pools for the SL transmission if a congestion level of the at least one of the resource pools is lower than the congestion level threshold for the QoS threshold.

Alternatively, the QoS requirement is represented as one of 5G QoS Indicator (5QI), QoS Class Identifier (QCI), ProSe Per-Packet Priority (PPPP) or ProSe Per-Packet Reliability (PPPR).

Alternatively, the bearer configuration comprises a mapping relationship between the QoS requirement and a SL Data Radio Bearer (DRB).

Alternatively, the bearer configuration further comprises a transmit parameter.

Alternatively, the transmit parameter comprises at least one of transmitting power for SL transmission, Modulation Coding Scheme (MCS), carrier aggregation, packet duplication configuration, and SL resources being used.

Alternatively, the method further comprises the step of determining bearer reconfiguration for SL transmission on the basis of QoS performance.

Alternatively, the step b) comprises:
retrieving an index corresponding to the QoS requirement; and
if failed, transmitting a notification that the QoS requirement is not supported.

Alternatively, the method further comprises the step of signaling to the UE information specifying which QoS requirement(s) are supported.

According to one or more embodiments of the present invention, an apparatus (30) for controlling sidelink (SL) QoS in a cellular network comprises:
a storage device (310) configured to store a computer program (320) comprising computer instructions; and
a processor (320) coupled to the storage device and configured to execute the computer instructions to:
a) in response to a bearer request indicating Quality of Service (QoS) requirement from a User Equipment (UE), determining (102) whether the bearer request is accepted on the basis of SL resources usage in a cellular network;
b) if accepted, determining (103) bearer configuration for SL transmission by the UE on the basis of the QoS requirement; and
c) transmitting (105) the bearer configuration to the UE.

Alternatively, the step a) comprises:
a1) if there are SL resources sufficient to fulfill the QoS requirement, the network node will accept the bearer request;
a2) if after dropping other bearer(s) with lower priority, there are SL resources sufficient to fulfill the QoS requirement, the network node will accept the bearer request; and
a3) if after dropping other bearer(s) with lower priority, there are still no SL resources to fulfill the QoS requirement, the network node will reject the bearer request.

Alternatively, the SL resources are in form of one or more resource pools, each of which corresponds to a respective QoS requirement.

Alternatively, configuration for the resource pools can be adjusted by adding new resource pool(s) or increasing the size of at least one of the resource pools.

Alternatively, a QoS threshold and a congestion level threshold are assigned to at least one of the resource pools and the UE is allowed to use the at least one of the resource pools for the SL transmission if a congestion level of the at least one of the resource pools is lower than the congestion level threshold for the QoS threshold.

Alternatively, the QoS requirement is represented as one of 5G QoS Indicator (5QI), QoS Class Identifier (QCI), ProSe Per-Packet Priority (PPPP) or ProSe Per-Packet Reliability (PPPR).

Alternatively, the bearer configuration comprises a mapping relationship between the QoS requirement and a SL Data Radio Bearer (DRB).

Alternatively, the bearer configuration further comprises a transmit parameter.

Alternatively, the transmit parameter comprises at least one of transmitting power for SL transmission, Modulation Coding Scheme (MCS), carrier aggregation, packet duplication configuration, and SL resources being used.

Alternatively, the apparatus (30) is further configured for determining bearer reconfiguration for SL transmission on the basis of QoS performance.

Alternatively, the step b) comprises:
retrieving an index corresponding to the QoS requirement; and
if failed, transmitting a notification that the QoS requirement is not supported.

Alternatively, the apparatus (30) is further configured for signaling to the UE information specifying which QoS requirement(s) are supported.

According to one or more embodiments of the present invention, a method for controlling sidelink (SL) Quality of Service (QoS) in a cellular network comprises the following steps carried out at a network node:
 a) in response to attachment to the cellular network or location update of a User Equipment (UE), determining (401) bearer configuration for SL transmission by the UE; and
 b) transmitting (402) the bearer configuration to the UE.

Alternatively, at step a), the bearer configuration is determined based on an operational mode in which the UE operates, and the operational mode comprise a Radio Resource Control (RRC) connected mode and an RRC idle mode.

Alternatively, the bearer configuration comprises a mapping relationship between the QoS requirement and a SL Data Radio Bearer (DRB).

Alternatively, the bearer configuration further comprises a transmit parameter.

Alternatively, the transmit parameter comprises at least one of transmitting power for SL transmission, Modulation Coding Scheme (MCS), carrier aggregation, packet duplication configuration, and SL resources being used.

Alternatively, the method further comprises the step of signaling to the UE information specifying which QoS requirement(s) are supported.

According to one or more embodiments of the present invention, an apparatus (50) for controlling sidelink (SL) Quality of Service (QoS) in a cellular network comprises:
a storage device (510) configured to store a computer program (530) comprising computer instructions; and
a processor (520) coupled to the storage device and configured to execute the computer instructions to:
 a) in response to attachment to the cellular network or location update for a User Equipment (UE), determining (401) bearer configuration for SL transmission by the UE; and
 b) transmitting (402) the bearer configuration to the UE.

Alternatively, at step a), the bearer configuration is determined based on an operational mode in which the UE operates, and the operational mode comprise a Radio Resource Control (RRC) connected mode and an RRC idle mode.

Alternatively, the bearer configuration comprises a mapping relationship between the QoS requirement and a SL Data Radio Bearer (DRB).

Alternatively, the bearer configuration further comprises a transmit parameter.

Alternatively, the transmit parameter comprises at least one of transmitting power for SL transmission, Modulation Coding Scheme (MCS), carrier aggregation, packet duplication configuration, and SL resources being used.

Alternatively, the apparatus (50) is further configured for signaling to the UE information specifying which QoS requirement(s) are supported.

According to one or more embodiments of the present invention, a method for controlling sidelink (SL) Quality of Service (QoS) in a cellular network comprises the following steps carried out at a network node:
 a) determining (601) bearer configuration for SL transmission by a User Equipment (UE) in an Radio Resource Control (RRC) idle mode in the cellular network; and
 b) broadcasting (602) the bearer configuration in one or more cells of the cellular network.

Alternatively, the bearer configuration comprises a mapping relationship between the QoS requirement and a SL Data Radio Bearer (DRB).

Alternatively, the bearer configuration further comprises and a transmit parameter.

Alternatively, the transmit parameter comprises at least one of transmitting power for SL transmission, Modulation Coding Scheme (MCS), carrier aggregation, packet duplication configuration, and SL resources being used.

Alternatively, at step b), the bearer configuration is broadcasted via a System Information Block (SIB).

Alternatively, the method further comprises the step of signaling to the UE information specifying which QoS requirement(s) are supported.

According to one or more embodiments of the present invention, an apparatus (70) for controlling sidelink (SL) Quality of Service (QoS) in a cellular network comprises:
a storage device (710) configured to store a computer program (730) comprising computer instructions; and
a processor (720) coupled to the storage device and configured to execute the computer instructions to:
 a) determining (601) bearer configuration for SL transmission by a User Equipment (UE) in an Radio Resource Control (RRC) idle mode in the cellular network; and
 b) broadcasting (602) the bearer configuration in one or more cells of the cellular network.

Alternatively, the bearer configuration comprises a mapping relationship between the QoS requirement and a SL Data Radio Bearer (DRB).

Alternatively, the bearer configuration further comprises a transmit parameter.

Alternatively, the transmit parameter comprises at least one of transmitting power for SL transmission, Modulation Coding Scheme (MCS), carrier aggregation, packet duplication configuration, and SL resources being used.

Alternatively, at step b), the bearer configuration is broadcasted via a System Information Block (SIB).

Alternatively, the apparatus (70) is further configured for signaling to the UE information specifying which QoS requirement(s) are supported.

According to one or more embodiments of the present invention, a method for controlling sidelink (SL) Quality of Service (QoS) in a cellular network comprises the following steps carried out at a User Equipment (UE):
 a) generating (801) QoS requirement from characteristics for one or more packets to be transmitted via a sidelink;
 b) transmitting (802) a bearer request comprising the QoS requirement to a network node; and
 c) performing (804) SL transmission on the basis of bearer configuration received from the network node, wherein the bearer configuration is determined on the basis of the QoS requirement.

Alternatively, the characteristics are defined in a packet header complying with a protocol layer above Access Stratum (AS).

Alternatively, the step a) comprises converting the characteristics into corresponding QoS requirement on the basis of a mapping relationship between the characteristics and the QoS requirement.

Alternatively, the mapping relationship is received from the network node and stored at the UE, or preconfigured at the UE.

Alternatively, one or more candidate mapping relationships are received from the network node and stored at the UE, each of which corresponds to one or more operational modes, and the operational mode comprises a Radio Resource Control (RRC) connected mode, an RRC idle mode and Out of coverage (OoC) mode.

Alternatively, the mapping relationship is selected from the one or more candidate mapping relationships depending on which operational mode the UE operates in.

Alternatively, the method further comprises:
d) if receiving a notification from the network node that the QoS requirement is not supported, performing (805) the SL transmission in best effort strategy or cancelling the SL transmission.

Alternatively, the QoS requirement is represented as an index.

Alternatively, the method further comprises the step of receiving from the network node information specifying which QoS requirement(s) are supported.

Alternatively, the receiving is performed during an attachment procedure or via a System Information Block (SIB).

According to one or more embodiments of the present invention, a User Equipment (UE) (90) operating in a cellular network with sidelink (SL) Quality of Service (QoS) controlling function comprises:
a storage device (910) configured to store a computer program (930) comprising computer instructions; and
a processor (930) coupled to the storage device and configured to execute the computer instructions to:
  a) generating (801) QoS requirement from characteristics for one or more packets to be transmitted via a sidelink;
  b) transmitting (802) a bearer request comprising the QoS requirement to a network node; and
  c) performing (804) SL transmission on the basis of bearer configuration received from the network node, wherein the bearer configuration is determined on the basis of the QoS requirement.

Alternatively, the characteristics are defined in a packet header complying with a protocol layer above Access Stratum (AS).

Alternatively, the step a) comprises converting the characteristics into corresponding QoS requirement on the basis of a mapping relationship between the characteristics and the QoS requirement.

Alternatively, the mapping relationship is received from the network node and stored at the UE, or preconfigured at the UE.

Alternatively, one or more candidate mapping relationships are received from the network node and stored at the UE, each of which corresponds to one or more operational modes, and the operational mode comprises a Radio Resource Control (RRC) connected mode, an RRC idle mode and Out of coverage (OoC) mode.

Alternatively, the mapping relationship is selected from the one or more candidate mapping relationships depending on which operational mode the UE operates in.

Alternatively, the UE (90) is further configured for:
d) if receiving a notification from the network node that the QoS requirement is not supported, performing (805) the SL transmission in best effort strategy or cancelling the SL transmission.

Alternatively, the QoS requirement is represented as an index.

Alternatively, the UE is further configured for receiving from the network node information specifying which QoS requirement(s) are supported.

Alternatively, the receiving is performed during an attachment procedure or via a System Information Block (SIB).

According to one or more embodiments of the present invention, a method for controlling sidelink (SL) Quality of Service (QoS) comprises the following steps carried out at a User Equipment (UE):
  a) generating (1001) QoS requirement from characteristics for one or more packets to be transmitted via a sidelink;
  b) determining (1002) bearer configuration corresponding to the QoS requirement; and
  c) performing (1003) SL transmission on the basis of the bearer configuration.

Alternatively, the UE is out of coverage of a cellular network.

Alternatively, a mapping relationship between the QoS requirement and the bearer configuration is received from a network node and stored at the UE, or preconfigured at the UE.

Alternatively, the characteristics are defined in a packet header complying with a protocol layer above Access Stratum (AS).

Alternatively, the step a) comprising converting the characteristics into corresponding QoS requirement on the basis of a mapping relationship between the characteristics and the QoS requirement.

Alternatively, the mapping relationship between the characteristics and the QoS requirement is received from network node and stored at the UE, or preconfigured at the UE.

Alternatively, one or more candidate mapping relationships between the characteristics and the QoS requirement are received from the network node and stored at the UE, each of which corresponds to one or more operational modes, and the operational mode comprises a Radio Resource Control (RRC) connected mode, an RRC idle mode and Out of coverage (OoC) mode.

Alternatively, the mapping relationship between the characteristics and the QoS requirement is selected from the one or more candidate mapping relationships depending on which operational mode the UE operates in.

According to one or more embodiments of the present invention, a User Equipment (UE) (110) with sidelink (SL) Quality of Service (QoS) controlling function comprises:
a storage device (1110) configured to store a computer program (1130) comprising computer instructions; and
a processor (1130) coupled to the storage device and configured to execute the computer instructions to:
  a) generating (1001) QoS requirement from characteristics for one or more packets to be transmitted via a sidelink;
  b) determining (1002) bearer configuration corresponding to the QoS requirement; and
  c) performing (1003) SL transmission on the basis of the bearer configuration.

Alternatively, the UE is out of coverage of a cellular network.

Alternatively, a mapping relationship between the QoS requirement and the bearer configuration is received from a network node and stored at the UE, or preconfigured at the UE.

Alternatively, the characteristics are defined in a packet header complying with a protocol layer above Access Stratum (AS).

Alternatively, the step a) comprising converting the characteristics into corresponding QoS requirement on the basis of a mapping relationship between the characteristics and the QoS requirement.

Alternatively, the mapping relationship between the characteristics and the QoS requirement is received from the network node and stored at the UE, or preconfigured at the UE.

Alternatively, one or more candidate mapping relationships between the characteristics and the QoS requirement are received from the network node and stored at the UE, each of which corresponds to one or more operational modes, and the operational mode comprises a Radio Resource Control (RRC) connected mode, an RRC idle mode and Out of coverage (OoC) mode.

Alternatively, the mapping relationship between the characteristics and the QoS requirement is selected from the one or more candidate mapping relationships depending on which operational mode the UE operates in.

According to one or more embodiments of the present invention, a computer program product for controlling sidelink (SL) Quality of Service (QoS) in a cellular network, the computer program product being embodied in a computer readable storage medium and comprising computer instructions for carrying out the method as described above.

The following embodiments are presented to further illustrate the disclosure as described above.

According to one or more embodiments of the present invention, to support V2X services, five categories of requirements and five level of automations to better group various V2X service requirements are defined, which are characterized by:

Payload (Bytes);
Transmission rate (Message/Sec);
Maximum end-to-end latency (ms);
Reliability (%);
Data rate (Mbps);
Minimum required communication range (meters).

3GPP systems (e.g., LTE and NR), including both Uu and sidelink (SL) interfaces, is expected to fulfil the required Key Performance Indicators (KPIs).

QoS Management for Uu

According to one or more embodiments of the present invention QoS management for Uu interface is specified based on QoS parameters, e.g., 5QI, ARP, RQA, GPBR, MPBR, notification control and maximum packet loss rate. Before establishing a QoS flow, which corresponds to a radio bearer, admission control is performed. In case there are not enough free resources, the QoS flow may be rejected or an existing QoS flow may be preempted depending on its ARP. Assuming the QoS flow is accepted, it will be further treated in the network according to other QoS parameters. Note that a 5QI value corresponds to multiple QoS characteristics, namely resource type (GBR, Delay critical GBR or Non-GBR), priority level, packet delay budget, packet error rate, averaging window, and maximum Data Burst Volume (for Delay-critical GBR resource type only).

Table 1 gives a comparison between V2X KPIs and QoS parameter/characteristics. It indicates that most of the V2X KPIs are already covered except transmission rate and minimum required communication range. Transmission rate can be determined by the network based on the data rate, latency, and payload requirements Minimum required communication range is not a necessary QoS characteristic, which could be reflected by the destination address carried in the packet header, e.g. zone address in a geo-network. Relevant work regarding QoS framework for Uu is ongoing in SA2. Potential RAN enhancements for V2X may be developed based on inputs from SA2.

TABLE 1

Comparison between V2X service KPI and QoS parameter/characteristic

| V2X service KPI | QoS parameter/characteristic |
| --- | --- |
| Payload | Maximum data burst volume |
| Transmission rate | N/A |
| Maximum end-to-end latency | Packet delay budget |
| Reliability | Packet error rate |
| Data rate | GFBR/MFBR |
| Minimum required communication range | N/A |

QoS Management for SL

According to one or more embodiments of the present invention, QoS management for SL is based on PPPP and/or PPPR. PPPP indicates the relative priority and reflects the latency requirement. PPPR describes the required reliability level with range from 1 to 8. Each generated V2X application packet will be configured with a PPPP value and optionally with a PPPR value. The packet will be treated in the lower layers according to PPPP/PPPR. Within one UE, packets with lower PPPP, meaning a low latency requirement, will be transmitted first. Among multiple UEs, packets with lower PPPP/PPPR can be transmitted using same resources occupied by other UEs for higher PPPP packet transmissions. In LTE SL, the mapping between priority and LCID is left for UE implementation. It means there is no unified QoS handling rule among UEs and greedy UEs are allowed to assign lowest PPPP value to their generated packets.

LTE SL UEs may handle logical channel prioritization differently depending on their implementations.

A unified QoS handling rule, e.g. map a packet to a corresponding QoS flow, may be used for NR SL UEs.

Besides, there may be no explicit admission control mechanism in SL. Currently, when channel is full, UEs with low PPPP packets are allowed to transmit using those resources occupied by other UEs with high PPPP packets. As a consequence, severe collision will occur until collided transmitters drive far away from each other or a UE reselects its resource. A more concrete admission control may be needed in SL, such that a V2X service, which maps to one radio flow, only activates if there are enough free resources available.

A more concrete admission control mechanism in SL may be needed.

To enhance the admission control in SL, pre-emption mechanism may be needed to drop low priority packet transmissions when high priority packet transmission is requested and there are not enough free resources.

In one of mode, e.g., Mode 3, gNB keep monitoring the resource usage of SL UEs. When channel is full, gNB can first stop some lowest priority packet transmissions and reserve those resources for newly arrived high priority packets.

In another mode, e.g., Mode 4, a pre-emption signalling can be designed. UEs with high priority packets can pre-empt some resources used for low priority packets before starting its own transmission.

In the previous embodiments, the following may be obtained:

V2X service KPIs may be covered in 5GS QoS management for Uu.

LTE SL UEs may handle logical channel prioritization differently depending on their implementations.

A more concrete admission control mechanism in SL may be needed.

5GS QoS framework may be used for V2X services over Uu-interface.

A unified QoS handling rule, e.g. map a packet to a corresponding QoS flow, may be used for NR SL UEs.

In Mode3, gNB keep monitoring the resource usage of SL UEs. When channel is full, gNB can first stop some lowest priority packet transmissions and reserve those resources for newly arrived high priority packets.

In Mode4, a pre-emption signalling can be designed. UEs with high priority packets can pre-empt some resources used for low priority packets before starting its own transmission.

It should be noted that the aforesaid embodiments are illustrative instead of restricting, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. Embodiments can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method by a User Equipment (UE) for controlling sidelink (SL) Quality of Service (QoS) in a cellular network to which the UE is connected, comprising:
    a) generating QoS requirement from characteristics for one or more packets to be transmitted via a sidelink;
    b) transmitting a bearer request comprising the QoS requirement to a network node; and
    c) performing SL transmission on the basis of a bearer configuration received from the network node, wherein the bearer configuration is determined on the basis of the QoS requirement and comprises a mapping relationship between the QoS requirement and a SL Data Radio Bearer (DRB).

2. The method according to claim 1, wherein the characteristics are defined in a packet header complying with a protocol layer above Access Stratum (AS).

3. The method according to claim 1, the step a) comprising converting the characteristics into corresponding QoS requirement on the basis of a mapping relationship between the characteristics and the QoS requirement.

4. The method according to claim 3, the mapping relationship between the characteristics and the QoS requirement is received from the network node and stored at the UE, or preconfigured at the UE.

5. The method according to claim 3, wherein one or more candidate mapping relationships are received from the network node and stored at the UE, each of which corresponds to one or more operational modes, and the operational mode comprises a Radio Resource Control (RRC) connected mode, an RRC idle mode and Out of coverage (OoC) mode.

6. The method according to claim 5, wherein the mapping relationship between the characteristics and the QoS requirement is selected from the one or more candidate mapping relationships depending on which operational mode the UE operates in.

7. The method according to claim 5, wherein the mapping relationship between the QoS requirement and the bearer configuration and the candidate mapping relationships between the characteristics and the QoS requirement are received via broadcast from the network node.

8. The method according to claim 5, wherein at least two of the candidate mapping relationships are received from the network node and stored at the UE.

9. The method according to claim 1, further comprising:
    d) if receiving a notification from the network node that the QoS requirement is not supported, performing the SL transmission in best effort strategy or cancelling the SL transmission.

10. The method according to claim 1, the QoS requirement is represented as an index.

11. The method according to claim 1, further comprising the step of receiving from the network node information specifying which QoS requirement(s) are supported.

12. The method according to claim 11, the receiving is performed during an attachment procedure or via a System Information Block (SIB).

13. The method according to claim 1, wherein the performing of the SL transmission on the basis of the bearer configuration received from the network node, comprises:
    determining one or more transmitting parameters mapped by the mapping relationship of the bearer configuration to the QoS requirement; and
    performing the SL transmission based on a combination of the determined one or more transmitting parameters and the determined SL DRB.

14. The method according to claim 13, wherein:
    the determining comprises determining transmitting power mapped by the mapping relationship of the bearer configuration to the QoS requirement; and
    performing the SL transmission based on a combination of the determined transmitting power and the determined SL DRB.

15. The method according to claim 13, wherein:
    the determining comprises determining a Modulation Coding Scheme (MCS) mapped by the mapping relationship of the bearer configuration to the QoS requirement; and
    performing the SL transmission based on a combination of the determined MCS and the determined SL DRB.

16. The method according to claim 13, wherein:
    the determining comprises determining a carrier aggregation mapped by the mapping relationship of the bearer configuration to the QoS requirement; and
    performing the SL transmission based on a combination of the determined carrier aggregation and the determined SL DRB.

17. The method according to claim 13, wherein:
    the determining comprises determining a packet duplication configuration mapped by the mapping relationship of the bearer configuration to the QoS requirement; and
    performing the SL transmission based on a combination of the determined packet duplication configuration and the determined SL DRB.

18. A User Equipment (UE) operating in a cellular network with sidelink (SL) Quality of Service (QoS) controlling function, the UE comprising:
    a storage device configured to store a computer program comprising computer instructions; and
    a processor coupled to the storage device and configured to execute the computer instructions to, while the UE is connected to the cellular network:

a) generate QoS requirement from characteristics for one or more packets to be transmitted via a sidelink;
b) transmit a bearer request comprising the QoS requirement to a network node; and
c) perform SL transmission on the basis of bearer configuration received from the network node, wherein the bearer configuration is determined on the basis of the QoS requirement and comprises a mapping relationship between the QoS requirement and a SL Data Radio Bearer (DRB).

19. The UE according to claim 18, wherein the characteristics are defined in a packet header complying with a protocol layer above Access Stratum (AS).

20. The UE according to claim 18, the step a) comprising converting the characteristics into corresponding QoS requirement on the basis of a mapping relationship between the characteristics and the QoS requirement.

21. The UE according to claim 20, the mapping relationship between the characteristics and the QoS requirement is received from the network node and stored at the UE, or preconfigured at the UE.

22. The UE according to claim 20, wherein one or more candidate mapping relationships are received from the network node and stored at the UE, each of which corresponds to one or more operational modes, and the operational mode comprises a Radio Resource Control (RRC) connected mode, an RRC idle mode and Out of coverage (OoC) mode.

23. The UE according to claim 22, wherein the mapping relationship between the characteristics and the QoS requirement is selected from the one or more candidate mapping relationships depending on which operational mode the UE operates in.

24. The UE according to claim 22, wherein the mapping relationship between the QoS requirement and the bearer configuration and the candidate mapping relationships between the characteristics and the QoS requirement are received via broadcast from the network node.

25. The UE according to claim 22, wherein at least two of the candidate mapping relationships are received from the network node and stored at the UE.

26. The UE according to claim 18, the processor further configured to:
d) if receiving a notification from the network node that the QoS requirement is not supported, performing the SL transmission in best effort strategy or cancelling the SL transmission.

27. The UE according to claim 18, the QoS requirement is represented as an index.

28. The UE according to claim 18, the processor further configured to receive from the network node information specifying which QoS requirement(s) are supported.

29. The UE according to claim 28, the receiving is performed during an attachment procedure or via a System Information Block (SIB).

30. A computer program product for controlling sidelink (SL) Quality of Service (QoS) in a cellular network, the computer program product comprising a non-transitory computer readable storage medium storing computer instructions executable by a processor of a user equipment (UE) to:
a) generate QoS requirement from characteristics for one or more packets to be transmitted via a sidelink;
b) transmit a bearer request comprising the QoS requirement to a network node; and
c) perform SL transmission on the basis of bearer configuration received from the network node, wherein the bearer configuration is determined on the basis of the QoS requirement and comprises a mapping relationship between the QoS requirement and a SL Data Radio Bearer (DRB).

* * * * *

UNITED STATES PATENT AND TRADEMARK OFFICE
CERTIFICATE OF CORRECTION

Page 1 of 2

PATENT NO. : 11,770,741 B2
APPLICATION NO. : 17/265952
DATED : September 26, 2023
INVENTOR(S) : Zhang et al.

It is certified that error appears in the above-identified patent and that said Letters Patent is hereby corrected as shown below:

On the Title Page

On Page 2, in Item (56), under "OTHER PUBLICATIONS", in Column 2, Line 11, delete "V15.1.0 ," and insert -- V15.1.0, --, therefor.

In the Drawings

In Fig. 2, Sheet 2 of 6, delete "LCGID)" and insert -- LCG ID) --, therefor.

In the Specification

In Column 2, Line 2, delete "PPPPR" and insert -- PPPR --, therefor.

In Column 4, Line 6, delete "mode4" and insert -- Mode 4 --, therefor.

In Column 4, Line 66, delete "illustrating A User" and insert -- illustrating a User --, therefor.

In Column 7, Lines 37-38, delete "SLUeInformation" and insert -- SL UE Information --, therefor.

In Column 8, Line 46, delete "mode 3" and insert -- Mode 3 --, therefor.

In Column 8, Line 47, delete "mode 4" and insert -- Mode 4 --, therefor.

In Column 9, Line 33, delete "(DRB) Optionally," and insert -- (DRB). Optionally, --, therefor.

In Column 10, Line 41, delete "Universal Integrated Card (UICC)" and insert -- Universal Integrated Circuit Card (UICC) --, therefor.

In Column 16, Lines 6-7, delete "comprises and a" and insert -- comprises a --, therefor.

Signed and Sealed this
Fourteenth Day of May, 2024

Katherine Kelly Vidal
*Director of the United States Patent and Trademark Office*

CERTIFICATE OF CORRECTION (continued)
U.S. Pat. No. 11,770,741 B2

In Column 19, Lines 43-44, delete "GPBR, MPBR," and insert -- GFBR, MFBR, --, therefor.

In Column 19, Line 61, delete "requirements Minimum" and insert -- requirements. Minimum --, therefor.

In Column 21, Line 7, delete "Mode3," and insert -- Mode 3, --, therefor.

In Column 21, Line 11, delete "Mode4," and insert -- Mode 4, --, therefor.